(12) United States Patent
Kwon et al.

(10) Patent No.: US 8,964,670 B2
(45) Date of Patent: Feb. 24, 2015

(54) METHOD FOR TRANSMITTING CONTROL INFORMATION IN A WIRELESS COMMUNICATION SYSTEM USING MULTIPLE CARRIERS

(75) Inventors: Yeong Hyeon Kwon, Anyang-si (KR); So Yeon Kim, Anyang-si (KP); Sung Ho Moon, Anyang-si (KR); Jae Hoon Chung, Anyang-si (KR); Seung Hee Han, Anyang-si (KR)

(73) Assignee: LG Electronics Inc., Seoul (KR)

( * ) Notice: Subject to any disclaimer, the term of this patent is extended or adjusted under 35 U.S.C. 154(b) by 287 days.

(21) Appl. No.: 13/520,295

(22) PCT Filed: Feb. 25, 2011

(86) PCT No.: PCT/KR2011/001322
§ 371 (c)(1),
(2), (4) Date: Jul. 2, 2012

(87) PCT Pub. No.: WO2011/105845
PCT Pub. Date: Sep. 1, 2011

(65) Prior Publication Data
US 2012/0294252 A1     Nov. 22, 2012

Related U.S. Application Data

(60) Provisional application No. 61/307,858, filed on Feb. 25, 2010.

(51) Int. Cl.
*H04L 5/00* (2006.01)
*H04W 28/04* (2009.01)
(Continued)

(52) U.S. Cl.
CPC ............ *H04L 5/0053* (2013.01); *H04L 5/0007* (2013.01); *H04W 28/04* (2013.01); *H04W 28/048* (2013.01); *H04W 48/16* (2013.01); *H04W 72/02* (2013.01); *H04W 72/042* (2013.01)
USPC .......................................................... 370/329

(58) Field of Classification Search
None
See application file for complete search history.

(56) References Cited

U.S. PATENT DOCUMENTS

2008/0311942 A1 * 12/2008 Kim et al. ...................... 455/509
2009/0022110 A1    1/2009 Muharemovic et al.
(Continued)

FOREIGN PATENT DOCUMENTS

WO    WO 2008115004 A2 *  9/2008
WO    WO 2009057286 A1 *  5/2009

OTHER PUBLICATIONS

ZTE, PUCCH resource region for LTE-A, R1-091421, 3GPP TSG RAN WG1 Meeting #56bis, Seoul, Korea, Mar. 23-27, 2009, pp. 1-15.*

*Primary Examiner* — Huy D Vu
*Assistant Examiner* — Benjamin Lamont
(74) *Attorney, Agent, or Firm* — Birch, Stewart, Kolasch & Birch, LLP

(57) ABSTRACT

The present invention relates to a method in which a terminal transmits uplink control information in a wireless communication system using multiple carriers. The method comprises the following steps: receiving, from a base station, indication information that indicates whether or not to use multiple uplink control resources; determining a first uplink control resource on the basis of a specific control channel element (CCE) index of the CCE received from the base station; and, if the indication information indicates to use multiple uplink control resources, applying a predetermined rule to the specific CCE index to determine a second uplink control resource.

6 Claims, 14 Drawing Sheets

(51) Int. Cl.
*H04W 48/16* (2009.01)
*H04W 72/02* (2009.01)
*H04W 72/04* (2009.01)

(56) References Cited

U.S. PATENT DOCUMENTS

| | | | |
|---|---|---|---|
| 2009/0046793 A1* | 2/2009 | Love et al. | 375/260 |
| 2009/0247174 A1 | 10/2009 | Zhang et al. | |
| 2009/0279500 A1 | 11/2009 | Luo et al. | |
| 2010/0098005 A1 | 4/2010 | Lee et al. | |
| 2010/0232388 A1* | 9/2010 | Nakao et al. | 370/329 |
| 2010/0303011 A1* | 12/2010 | Pan et al. | 370/328 |
| 2010/0322114 A1* | 12/2010 | Li et al. | 370/278 |
| 2011/0110316 A1* | 5/2011 | Chen et al. | 370/329 |
| 2011/0199997 A1* | 8/2011 | Wennstrom et al. | 370/329 |
| 2012/0093104 A1* | 4/2012 | Tiirola et al. | 370/329 |

* cited by examiner

FIG. 8
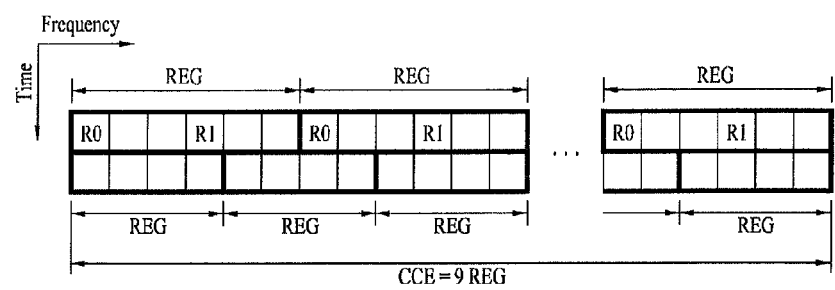
(a) 1TX or 2TX
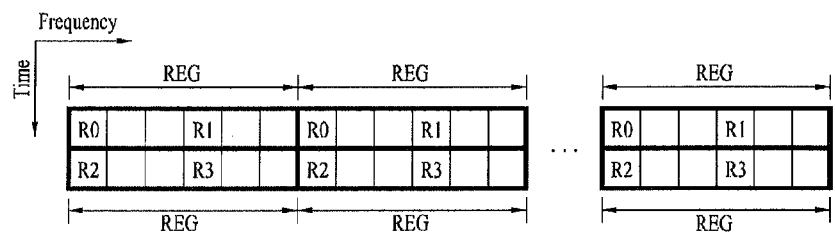
(b) 4TX

METHOD FOR TRANSMITTING CONTROL INFORMATION IN A WIRELESS COMMUNICATION SYSTEM USING MULTIPLE CARRIERS

CROSS REFERENCE TO RELATED APPLICATIONS

This application is the National Phase of PCT/KR2011/001322 filed on Feb. 25, 2011, which claims priority under 35 U.S.C. 119(e) to U.S. Provisional Application No. 61,307,858 filed on Feb. 25. 2010, all of which are hereby expressly incorporated by reference into the present application.

FIELD OF THE INVENTION

The present invention relates to a wireless communication system using multiple carriers, and more particularly to a method for transmitting uplink control information in a wireless communication system using multiple carriers.

BACKGROUND ART

Wireless communication systems have been widely used to provide various kinds of communication services such as voice or data services. Generally, a wireless communication system is a multiple access system that can communicate with multiple users by sharing available system resources (bandwidth, transmission (Tx) power, and the like). A variety of multiple access systems can be used. For example, a Code Division Multiple Access (CDMA) system, a Frequency Division Multiple Access (FDMA) system, a Time Division Multiple Access (TDMA) system an Orthogonal Frequency Division Multiple Access (OFDMA) system, a Single Carrier Frequency-Division Multiple Access (SC-FDMA) system, a Multi-Carrier Frequency Division Multiple Access (MC-FDMA) system, and the like. In a mobile communication system, a user equipment (UE) may receive information from a base station (BS) via downlink, and may transmit information to the base station (BS) via uplink. The information that is transmitted and received to and from the UE includes data and a variety of control information. A variety of physical channels are used according to categories and usages of transmission (Tx) and reception (Rx) information of the UE.

As a representative example of a wireless communication system of the present invention, a $3^{rd}$ Generation Partnership Project Long Term Evolution (3GPP LTE) communication system will hereinafter be described in detail.

FIG. 1 is a conceptual diagram illustrating an Evolved Universal Mobile Telecommunications System (E-UMTS) network structure as an exemplary mobile communication system. In particular, the Enhanced Universal Mobile Telecommunications System (E-UMTS) has evolved from a legacy UMTS system, and basic standardization thereof is now being conducted by the 3rd Generation Partnership Project (3GPP). E-UMTS may also be referred to as Long Term Evolution (LTE). For details of the technical specifications of UMTS and E-UMTS, refer to Release 7 and Release 8 of "3rd Generation Partnership Project; Technical Specification Group Radio Access Network".

As shown in FIG. 1, the E-UMTS system is broadly made up of a User Equipment (UE) 120, base stations (or eNode-Bs) 110a and 110b, and an Access Gateway (AG) which is located at an end of a network (E-UTRAN) and is connected to an external network. Generally, an eNode-B can simultaneously transmit multiple data streams for a broadcast service, a multicast service and/or a unicast service.

Each eNode-B includes one or more cells. One cell of the eNode-B is set to use a bandwidth such as 1.25, 2.5, 5, 10, 15 or 20 MHz to provide a downlink or uplink transmission service to user equipments (UEs). Here, different cells may be set to use different bandwidths. The eNode-B controls transmission and reception of data for several UEs. In association with downlink (DL) data, the eNode-B transmits downlink (DL) scheduling information to a corresponding UE, so as to inform the corresponding UE of time/frequency domains where data is to be transmitted, coding information, data size information, Hybrid Automatic Repeat and reQuest (HARQ)—related information, and the like. In association with uplink (UL) data, the eNode-B transmits UL scheduling information to the corresponding UE, so that it informs the corresponding UE of time/frequency domains capable of being used by the corresponding UE, coding information, data size information, HARQ-related information, and the like. An interface for transmission of user traffic or control traffic may be used between eNode-Bs. A Core Network (CN) may include an Access Gateway (AG) and a network node for user registration of the UE. The AG manages mobility of a UE on the basis of a Tracking Area (TA) composed of several cells.

Although wireless communication technology has been developed to LTE technology on the basis of WCDMA technology, users and enterprises continuously demand new features and services. In addition, other wireless access technologies are being developed, such that there is a need for new or improved wireless access technology in order to remain competitive in the long run. For example, reduction in cost per bit, increase of service availability, adaptive frequency band utilization, a simple structure, an open-type interface, and appropriate user equipment (UE) power consumption are needed for new or improved wireless access technology.

Recently, 3GPP has been establishing a standard task for a subsequent technique of LTE. In this specification, such a technique is referred to as "LTE-Advanced" or "LTE-A". One of the main differences between an LTE system and an LTE-A system is a system bandwidth. The LTE-A system is aimed at supporting a broadband of a maximum of 100 MHz, and to this end, the LTE-A system is designed to use a carrier aggregation or bandwidth aggregation technique using a plurality of frequency blocks. Carrier aggregation employs a plurality of frequency blocks as one big logical frequency band in order to use a wider frequency band. A bandwidth of each frequency block may be defined based on a bandwidth of a system block used in the LTE system. Each frequency block is transmitted using a component carrier. Multiple carriers may also be referred to as carrier aggregation or bandwidth aggregation.

DETAILED DESCRIPTION OF THE INVENTION

Technical Problem

Accordingly, the present invention is directed to a method for transmitting uplink control information in a wireless communication system using multiple carriers that substantially obviate one or more problems due to limitations and disadvantages of the related art. An object of the present invention is to provide a method for effectively transmitting control information using multiple resources when control information is transmitted as a response to multiple carriers in a wireless communication system using multiple carriers.

Another object of the present invention is to provide a method for effectively determining a resource region by enabling a user equipment (UE) to determine whether to use multiple carriers, and transmitting control information according to the determined resource region.

It is to be understood that technical objects to be achieved by the present invention are not limited to the aforementioned technical objects and other technical objects which are not mentioned herein will be apparent from the following description to one of ordinary skill in the art to which the present invention pertains.

Technical Solution

The object of the present invention can be achieved by providing a method for transmitting uplink control information by a user equipment in a wireless communication system supporting multiple carriers, the method including receiving indication information indicating use or disuse of multiple uplink control resources from a base station; determining a first uplink control resource on the basis of a specific control channel element (CCE) index of a control channel element (CCE) received from the base station; and if the indication information indicates the use of multiple uplink control resources, determining a second uplink control resource by applying a predetermined rule to the specific CCE index. Those skilled in the art will appreciate that the exemplary embodiments of the present invention are merely part of preferred embodiments of the present invention and various embodiments of the present invention reflecting the technical features of the present invention can be derived and understood from the following detailed description of the present invention.

Effects of the Invention

As is apparent from the above description, exemplary embodiments of the present invention have the following effects. If frequency resources are extended in a wireless communication system, channel information can be effectively acquired from the extended resource region, and the resultant channel information can be transmitted via uplink.

In addition, if an uplink signal transmitted through the extended resource region collides with an uplink signal transmitted through a legacy resource region, only one of the uplink signals is transmitted according to a predetermined drop rule, resulting in reduction in signal interference.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

BRIEF DESCRIPTION OF THE DRAWINGS

The accompanying drawings, which are included to provide a further understanding of the invention, illustrate embodiments of the invention and together with the description serve to explain the principle of the invention.

In the drawings:

FIGS. 8(a) and 8(b) show resource units used for constructing a control channel;

BEST MODE FOR CARRYING OUT THE INVENTION

Figure 1:
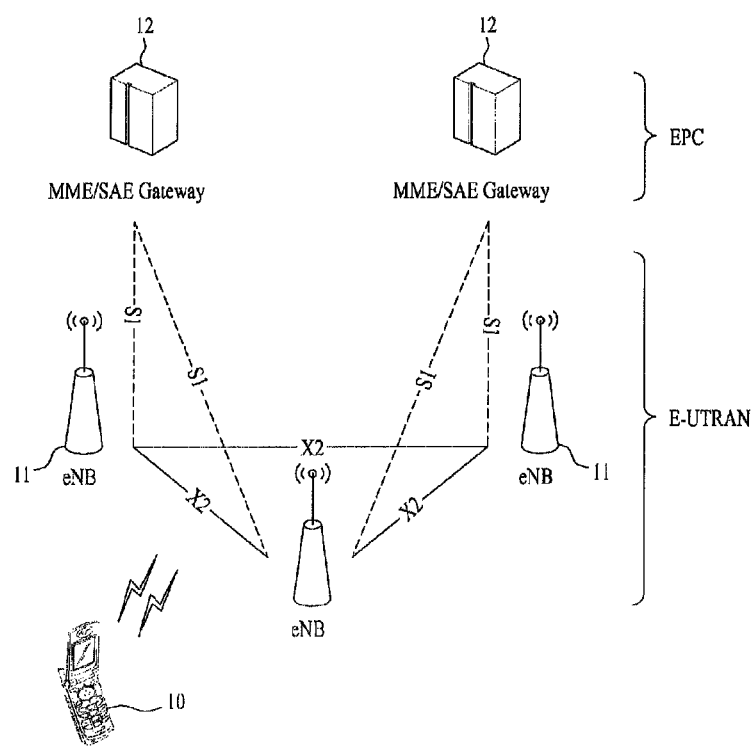
FIG. 1 is a conceptual diagram illustrating an Evolved Universal Mobile Telecommunications System (E-UMTS) network structure as an example of a wireless communication system.

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details. For example, the following description will be given centering upon a mobile communication system serving as a 3GPP LTE system, but the present invention is not limited thereto and the remaining parts of the present invention other than unique characteristics of the 3GPP LTE system are applicable to other mobile communication systems.

In some cases, in order to prevent ambiguity of the concepts of the present invention, conventional devices or apparatuses well known to those skilled in the art will be omitted and be denoted in the form of a block diagram on the basis of important functions of the present invention. Wherever possible, the same reference numbers will be used throughout the drawings to refer to the same or like parts.

In the following description, a terminal may refer to a mobile or fixed user equipment (UE), for example, a user equipment (UE), a mobile station (MS) and the like. Also, the base station (BS) may refer to an arbitrary node of a network end which communicates with the above terminal, and may include an eNode B (eNB), a Node B (Node-B), an access point (AP) and the like.

The following embodiments of the present invention can be applied to a variety of wireless access technologies, for example, code division multiple access (CDMA), frequency division multiple access (FDMA), time division multiple access (TDMA), orthogonal frequency division multiple access (OFDMA), single carrier frequency division multiple access (SC-FDMA), and the like. CDMA can be implemented by wireless communication technologies, such as Universal Terrestrial Radio Access (UTRA) or CDMA2000. TDMA can be implemented by wireless communication technologies, for example, a Global System for Mobile communications (GSM), a General Packet Radio Service (GPRS), an Enhanced Data rates for GSM Evolution (EDGE), etc. OFDMA can be implemented by wireless communication technologies, for example, IEEE 802.11 (Wi-Fi), IEEE 802.16 (WiMAX), IEEE 802.20, E-UTRA (Evolved UTRA), and the like. UTRA is a part of a Universal Mobile Telecommunications System (UMTS). 3rd Generation Partnership Project (3GPP) Long Term Evolution (LTE) is a part of an Evolved UMTS (E-UMTS) that uses an E-UTRA. LTE-Advanced (LTE-A) is an evolved version of 3GPP LTE.

Although the following embodiments of the present invention will hereinafter describe inventive technical characteristics on the basis of the 3GPP LTE/LTE-A system, it should be noted that the following embodiments will be disclosed only for illustrative purposes and the scope and spirit of the present invention are not limited thereto.

In a mobile communication system, the UE may receive information from the base station (BS) via a downlink, and may transmit information via an uplink. The information that is transmitted and received to and from the UE includes data and a variety of control information. A variety of physical channels are used according to categories of transmission (Tx) and reception (Rx) information of the UE.

Figure 2:
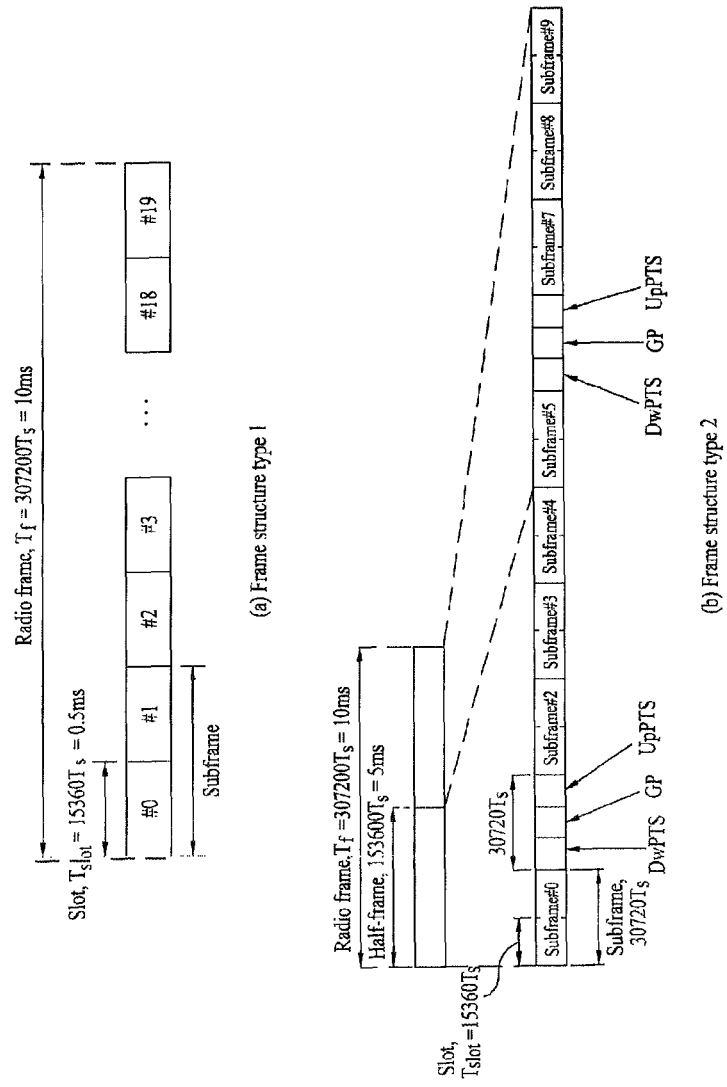
FIG. 2 is a diagram illustrating a structure of a radio frame used in a 3GPP LTE system.

FIG. 2 exemplarily shows a radio frame structure for use in a 3rd Generation Partnership Project Long Term Evolution (3GPP LTE) system.

Referring to FIG. 2, the radio frame has a length of 10 ms ($327200 \cdot T_s$) and includes 10 subframes of equal size. Each subframe has a length of 1 ms and includes two slots. In this case, $T_s$ represents sampling time, and is expressed by '$T_s=1/(15\ \text{kHz} \times 2048)=3.2552 \times 10^{-8}$ (about 33 ns)'. The slot includes a plurality of OFDM symbols in a time domain, and includes a plurality of resource blocks (RBs) in a frequency domain. In the LTE system, one resource block includes twelve (12) subcarriers×seven (or six) OFDM (Orthogonal Frequency Division Multiplexing) symbols. A frame structure type 1 is used for FDD, and a frame structure type 2 is used for TDD. The frame structure type 2 includes two half frames, and each half frame includes 5 subframes, a downlink piloting time slot (DwPTS), a guard period (GP), and an uplink piloting time slot (UpPTS). The aforementioned structure of the radio frame is only exemplary, and various modifications can be made to the number of subframes contained in the radio frame or the number of slots contained in each subframe, or the number of OFDM (or SC-FDMA) symbols in each slot.

Figure 3:
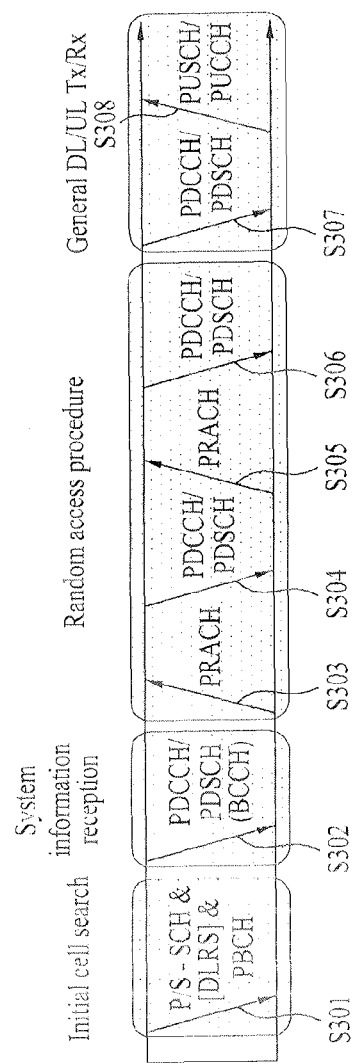
FIG. 3 is a conceptual diagram illustrating physical channels for use in a 3GPP LTE system and a method for transmitting a signal using the physical channels.

FIG. 3 is a conceptual diagram illustrating physical channels for use in a 3GPP system and a general method for transmitting a signal using the physical channels.

Referring to FIG. 3, when powered on or when entering a new cell, a UE performs initial cell search in step S301. The initial cell search involves synchronization with a BS. Specifically, the UE synchronizes with the BS and acquires a cell Identifier (ID) and other information by receiving a Primary Synchronization CHannel (P-SCH) and a Secondary Synchronization CHannel (S-SCH) from the BS. Then the UE may acquire information broadcast in the cell by receiving a Physical Broadcast CHannel (PBCH) from the BS. During the initial cell search, the MS may monitor a downlink channel status by receiving a downlink Reference Signal (DL RS).

After the initial cell search, the UE may acquire more specific system information by receiving a Physical Downlink Control CHannel (PDCCH) and receiving a Physical Downlink Shared CHannel (PDSCH) based on information of the PDCCH in step S302.

On the other hand, if the UE initially accesses the BS or if the UE does not have radio resources for signal transmission, it may perform a random access procedure to the BS in steps S303 to S306. For the random access, the UE may transmit a predetermined sequence as a preamble to the BS on a Physical Random Access CHannel (PRACH) in steps S303 and S305 and receive a response message for the random access on a PDCCH and a PDSCH corresponding to the PDCCH in steps S304 and S306. In the case of contention-based RACH, the UE may perform a contention resolution procedure.

After the foregoing procedure, the UE may receive a PDCCH and a PDSCH in step S307 and transmit a Physical Uplink Shared CHannel (PUSCH) and a Physical Uplink Control CHannel (PUCCH) in step S308, as a general downlink/uplink (DL/UL) signal transmission procedure. On the other hand, uplink control information transmitted from the UE to the BS or downlink control information transmitted from the UE to the BS may include a downlink (DL) or uplink (UL) ACKnowledgement/Negative ACKnowledgment (ACK/NACK) signal, a Channel Quality Indicator (CQI), a Precoding Matrix Index (PMI) and/or a Rank Indicator (RI). The UE adapted to operate in the 3GPP LTE system may transmit the control information such as a CQI, a PMI, and/or an RI on the PUSCH and/or the PUCCH.

Figure 4:
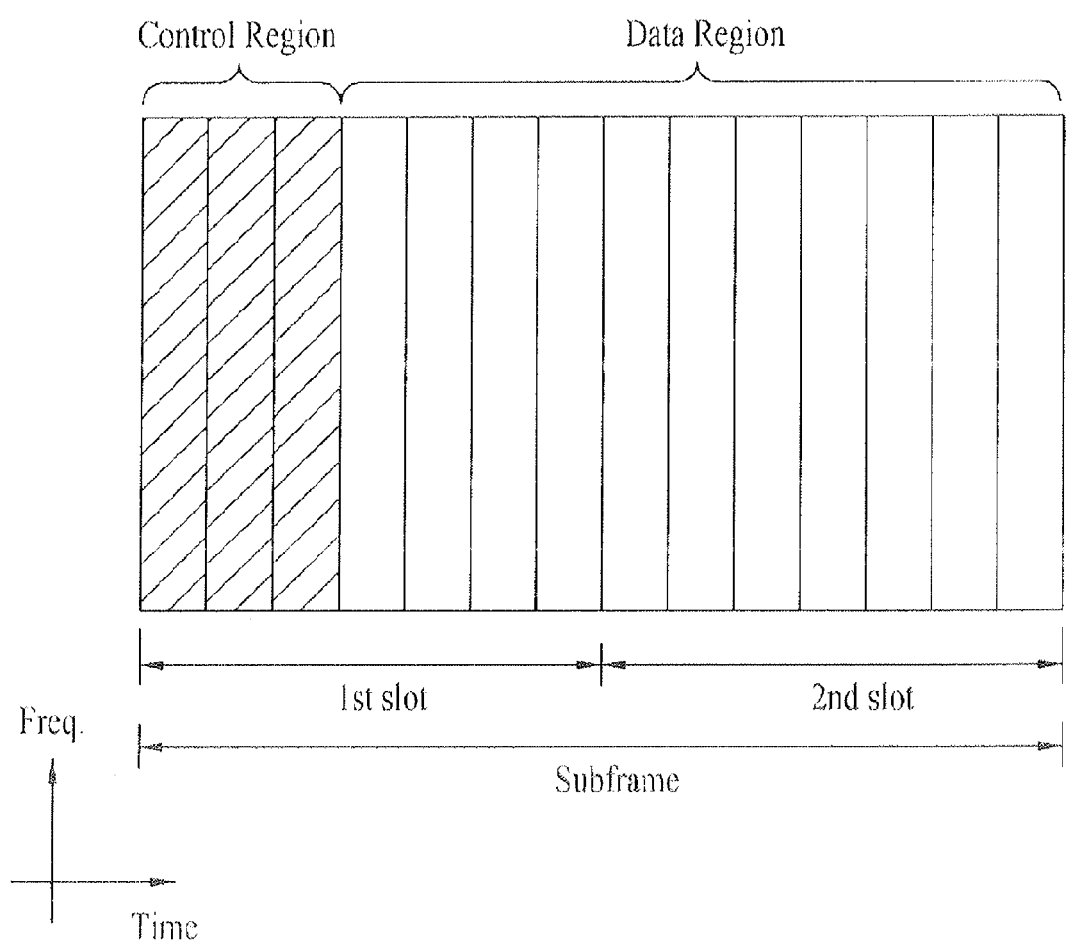
FIG. 4 illustrates a downlink (DL) subframe structure for use in a 3GPP LTE system.

FIG. 4 illustrates a downlink (DL) subframe structure for use in a 3GPP LTE system.

Referring to FIG. 4, one downlink subframe includes two slots in a time domain. A maximum of three OFDM symbols located in the front of the downlink subframe are used as a control region to which control channels are allocated, and the remaining OFDM symbols are used as a data region to which a Physical Downlink Shared Channel (PDSCH) channel is allocated.

DL control channels for use in the 3GPP LTE system include a Physical Control Format Indicator CHannel (PCFICH), a Physical Downlink Control Channel (PDCCH), a Physical Hybrid-ARQ Indicator CHannel (PHICH), and the like. The traffic channel includes a Physical Downlink Shared CHannel (PDSCH). PCFICH transmitted through a first OFDM symbol of the subframe may carry information about the number of OFDM symbols (i.e., the size of control region) used for transmission of control channels within the subframe. Control information transmitted through PDCCH is referred to as downlink control information (DCI). The DCI may indicate UL resource allocation information, DL resource allocation information, UL transmission power control commands of arbitrary UE groups, etc. PHICH may carry ACK (Acknowledgement)/NACK (Not-Acknowledgement) signals about an UL Hybrid Automatic Repeat Request (UL HARQ). That is, the ACK/NACK signals about UL data transmitted from the UE are transmitted over PHICH.

PDCCH acting as a DL physical channel will hereinafter be described in detail.

A base station (BS) may transmit information about resource allocation and transmission format (UL grant) of the PDSCH, resource allocation information of the PUSCH, information about Voice over Internet Protocol (VoIP) activation, etc. A plurality of PDCCHs may be transmitted within the control region, and the UE may monitor the PDCCHs. Each PFCCH includes an aggregate of one or more contiguous control channel elements (CCEs). The PDCCH composed of the aggregate of one or more contiguous CCEs may be transmitted through the control region after performing subblock interleaving. CCE is a logical allocation unit for providing a coding rate based on a Radio frequency (RF) channel status to the PDCCH. CCE may correspond to a plurality of resource element groups. PDCCH format and the number of available PDCCHs may be determined according to the relationship between the number of CCEs and the coding rate provided by CCEs. Control information transmitted over PDCCH is referred to as downlink control information (DCI). The following Table 1 shows DCIs in response to DCI formats.

TABLE 1

| DCI Format | Description |
| --- | --- |
| DCI format 0 | used for the scheduling of PUSCH |
| DCI format 1 | used for the scheduling of one PUSCH codeword |
| DCI format 1A | used for the compact scheduling of one PDSCH codeword and random access procedure initiated by a PDCCH order |
| DCI format 1B | used for the compact scheduling of one PDSCH codeword with precoding inforamtion |
| DCI format 1C | used for very compact scheduling of one PDSCH codeword |
| DCI format 1D | used for the compact scheduling of one PDSCH codeword with precoding and power offset information |
| DCI format 2 | used for scheduling PDSCH to UEs configured in closed-loop spatial multiplexing mode |
| DCI format 2A | used for scheduling PDSCH to UEs configured in open-loop spatial multiplexing mode |
| DCI format 3 | used for the transmission of TPC commands for PUCCH and PUSCH with 2-bit power adjustments |
| DCI format 3A | used for the transmission of TPC commands for PUCCH and PUSCH with single bit power adjustments |

In Table 1, DCI format 0 may indicate uplink resource allocation information. DCI format 1 and DCI format 2 may indicate downlink resource allocation information. DCI format 3 and DCI format 3A may indicate uplink transmit power control (TPC) commands for arbitrary UE groups.

Figure 5:
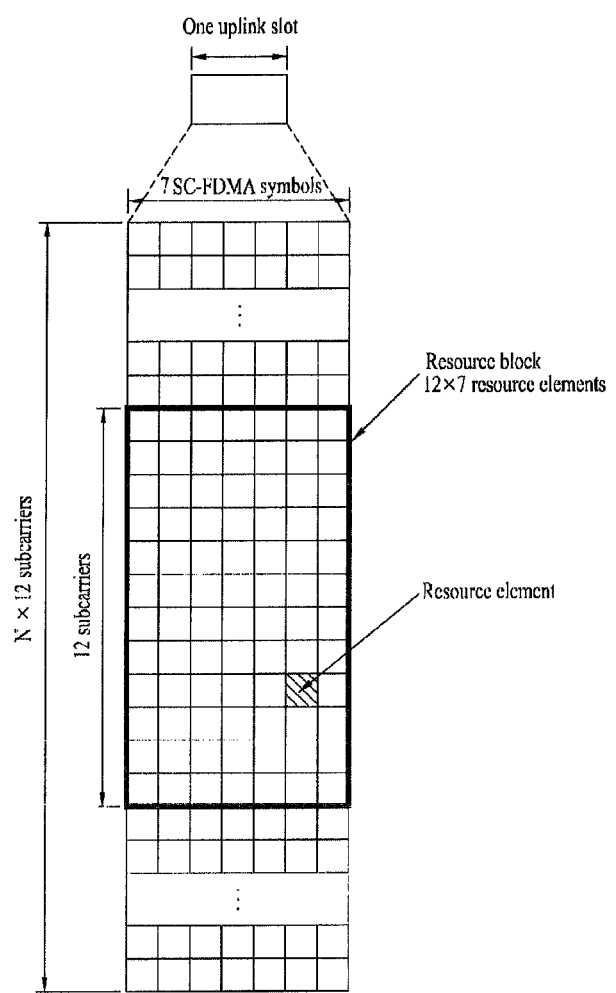
FIG. 5 shows a DL/UL time-frequency resource grid structure for use in a 3GPP LTE system.

FIG. 5 shows a downlink time-frequency resource grid structure for use in a 3GPP LTE system according to the present invention. In uplink and downlink, the same time-frequency resource grid structure is used as shown in FIG. 5.

Referring to FIG. 5, a signal transmitted in each slot can be described by a resource grid including $N_{RB} \times N_{SC}$ subcarriers and $N_{symb}$ downlink OFDM symbols or $N_{symb}$ uplink SC-FDMA symbols. Here, $N_{RB}$ represents the number of resource blocks (RBs), $N_{SC}$ represents the number of subcarriers constituting one RB, and $N_{symb}$ represents the number of OFDM or SC-FDMA symbols in one slot. $N_{RB}$ varies with a bandwidth constructed in a cell, and must satisfy $N_{RB}^{min} \leq N_{RB} \leq N_{RB}^{max}$. Here, $N_{RB}^{min}$ is the smallest bandwidth supported by the wireless communication system, and $N_{RB}^{max}$ is the largest bandwidth supported by the wireless communication system.

Although $N_{RB}^{min}$ may be set to 6 (N $N_{RB}^{min}$=6) and $N_{RB}^{max}$ may be set to 110 ($N_{RB}^{max}$=110), the scopes of $N_{RB}^{min}$ and $N_{RB}^{max}$ are not limited thereto. The number of OFDM or SC-FDMA symbols contained in one slot may be differently defined according to the length of a Cyclic Prefix (CP) and spacing between subcarriers. When transmitting data or information via multiple antennas, one resource grid may be defined for each antenna port m.

Each element contained in the resource grid for each antenna port is called a resource element (RE), and can be identified by an index pair (k,l) contained in a slot, where k is an index in a frequency domain and is set to any one of $0, \ldots, N_{RB}*N_{sc}-1$ and l is an index in a time domain and is set to any one of $0, \ldots, N_{symb}-1$.

Figure 6:
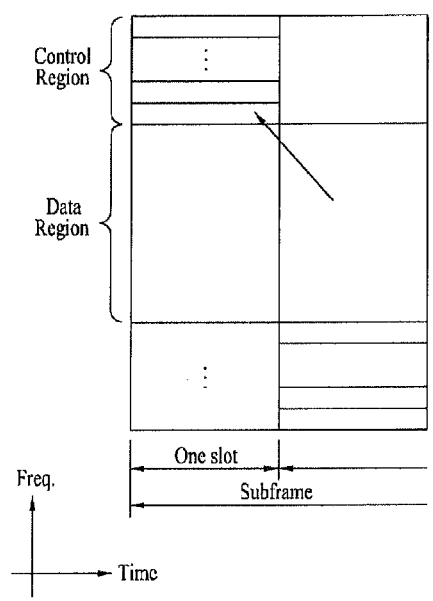
FIG. 6 illustrates an uplink (UL) subframe structure for use in a 3GPP LTE system.

FIG. 6 illustrates an uplink (UL) subframe structure for use in a 3GPP LTE system.

Referring to FIG. 6, the uplink (UL) subframe includes a plurality of slots (e.g., 2 slots). The UL subframe is divided into a data region and a control region in a frequency domain. The data region includes PUSCH and transmits a data signal such as voice, image and the like. The control region includes PUCCH, and transmits Uplink Control Information (UCI). PUCCH includes a pair of RBs (hereinafter referred to as an RB pair) located at both ends of the data region on a frequency axis, and is hopped using a slot as a boundary. Control information may include Hybrid Automatic Retransmit reQuest (HARQ) ACK/NACK, channel information for downlink (hereinafter referred to as 'downlink channel information' or 'channel information'). The downlink channel information may include a CQI, a PMI, an RI, etc. Upon receiving the downlink channel information from each UE, the BS can determine proper time/frequency resources, a modulation method, a coding rate, etc. required for transmitting data to each UE.

Channel information for use in the LTE system may include CQI, PMI, RI, etc. If necessary, some or all of CQI, PMI, and RI may be transmitted in response to a transmission mode of each UE. In an exemplary case in which channel information is periodically transmitted, this exemplary case is referred to as periodic reporting. In another exemplary case in which channel information is transmitted by a request of the BS, this exemplary case is referred to as aperiodic reporting. In case of the aperiodic reporting, a request bit contained in uplink scheduling information received form the BS is transmitted to a UE. Thereafter, the UE transmits channel information considering its own transmission mode to the BS over a PUSCH. In the case of the periodic reporting, a period, an offset for use in the corresponding period, etc. are semi-statically signaled in units of a subframe through a higher layer signal for each UE. Each UE transmits channel information considering the transmission mode to the BS through a PUCCH according to a predetermined period. If uplink data is also present in the subframe carrying channel information, the channel information as well as data is transmitted over an uplink data channel (PUSCH). The BS transmits transmission timing information appropriate for each UE to the UE in consideration of a channel condition of each UE, a UE distribution of each cell, etc. The transmission timing information may include a period, an offset, etc. required for transmitting channel information, and may be transmitted to each UE through a radio resource control (RRC) message.

Figure 7:
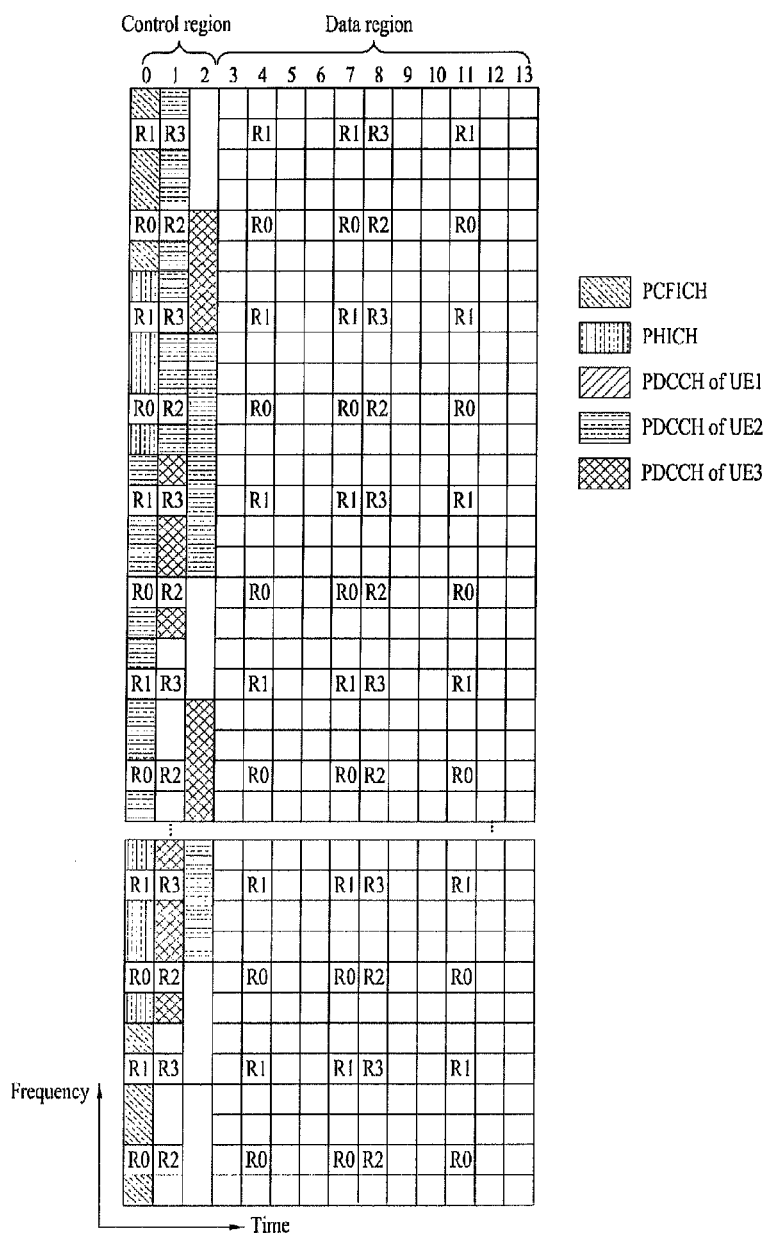
FIG. 7 shows a control channel contained in a control region of the subframe.

FIG. 7 shows a control channel contained in a control region of the subframe.

Referring to FIG. 7, one subframe includes 14 OFDM symbols. First to third ones of the 14 OFDM symbols may be used as a control region, and the remaining OFDM symbols (i.e., 11 to 13 OFDM symbols) may be used as a data region.

In FIG. 7, R1 to R4 represent reference signals (RSs) of antennas 0 to 3, respectively. In a general subframe, RSs of the antennas 0 to 3 are fixed to a predetermined pattern irrespective of a control region and a data region. The control channel is allocated to a resource, to which the RS is not allocated, in the control region. A traffic channel is allocated to a resource, to which the RS is not allocated, in the data region. A variety of control channels may be allocated to the control region, for example, a physical control format indicator channel (PCFICH), a physical hybrid—ARQ indicator channel (PHICH), a physical downlink control channel (PDCCH), etc.

PCFICH is used as a physical control format indicator channel, and informs the UE of the number of OFDM symbols used for PDCCH at every subframe. PCFICH is located at a first OFDM symbol, and is established to have priority over PHICH and PDCCH. PCFICH includes 4 resource element groups (REGs), and individual REGs are distributed into the control region on the basis of a cell ID. One REG includes four REs. The PCFICH value indicates values of 1 to 3 or values of 2 to 4 according to bandwidth, and is QPSK (Quadrature Phase Shift Keying)-modulated.

PHICH is used as a physical HARQ (Hybrid-Automatic Repeat and reQuest) indicator channel, and carries HARQ ACK/NACK signals for uplink transmission. The PHICH includes three REGs, and is cell-specifically scrambled. An ACK/NACK signal is indicated by one bit, is spread with a spreading factor (SF) of 2 or 4, and is repeated three times. Several PHICHs may be mapped to the same resources. PHICH is BPSK (Binary Phase Shift Keying)-modulated.

PDCCH acting as a physical downlink control channel is allocated to N first OFDM symbols of a subframe. In this case, N is an integer of 1 or higher and is indicated by a PCFICH. PDCCH includes one or more CCEs. PDCCH may inform each UE or a UE group of information related to resource allocation of PCH (Paging Channel) and DL-SCH (Downlink-shared channel), uplink scheduling grant, HARQ information, etc.

The PCH and the DL-SCH are transmitted through a PDSCH. Therefore, the BS and the UE may transmit and receive data other than either specific control information or specific service data through the PDSCH.

Information indicating which one of UEs will receive data as an input, information indicating how the UEs receive PDSCH data, and information indicating whether the decoding is carried out are contained in the PDCCH. For example, it is assumed that a specific PDCCH is CRC-masked with a Radio Network Temporary Identity (RNTI) called 'A', and information that is transmitted using radio resources 'B' (for example, a frequency location) and transmission format information 'C' (for example, a transmission block size, a modulation scheme, coding information, etc.), is transmitted through a specific subframe. In this case, a UE located in a cell monitors PDCCH using its own RNTI information. If at least one UE having the RNTI 'A' is present, the UEs receive PDCCH and receive PDSCH indicated by 'B' and 'C' through the received PDCCH information.

FIG. 8 is a diagram showing a resource unit used for configuring a control channel. FIG. 8(a) shows the case where the number of transmission antennas is 1 or 2 and FIG. 8(b) shows the case where the number of transmission antennas is 4, which are different from each other in only an RS pattern according to the number of transmission antennas, but are equal to each other in a method of setting a resource unit associated with the control channel.

Referring to FIGS. 8(a) and 8(b), the REG which is the basic resource unit of the control channel is composed of four neighbor REs in a state of excluding the RS. The REG is denoted by a thick line in the drawing. The PCFICH and the PHICH include four REGs and three REGs, respectively. The PDCCH is composed of CCE units and one CCE includes 9 REGs.

The UE is set to confirm M (L) (≥L) CCEs which are arranged consecutively or according to a specific rule in order to determine whether a PDCCH composed of L CCEs is transmitted to the UE. The value L which is considered when the UE receives the PDCCH may be plural. A set of CCEs which should be confirmed when the UE receives the PDCCH is referred to as a PDCCH search space. For example, in the LTE system, the PDCCH search space is defined as shown in Table 2.

TABLE 2

| | Search space $S_k^{(L)}$ | | | |
|---|---|---|---|---|
| Type | Aggregation level L | Size [in CCEs] | Number of PDCCH candidates $M^{(L)}$ | DCI formats |
| UE-specific | 1 | 6 | 6 | 0, 1, 1A, 1B, 2 |
| | 2 | 12 | 6 | |
| | 4 | 8 | 2 | |
| | 8 | 16 | 2 | |
| Common | 4 | 16 | 4 | 0, 1A, 1C, 3/3A |
| | 8 | 16 | 2 | |

In Table 2, CCE aggregation level (L) denotes the number of CCEs configuring the PDCCH, $S^{(L)}_k$ denotes the PDCCH search space, and $M^{(L)}$ denotes the number of PDCCH candidates to be monitored in the search space.

The PDCCH search space may be divided into a UE-specific search space in which access is allowed for only a specific UE and a common search space in which access is allowed for all UEs within a cell. The UE monitors the common search space at L=4 and 8 and monitors the UE-specific search space at L=1, 2, 4 and 8. The common search space and the UE-specific search space may overlap each other.

In addition, the location of a first CCE (having a smallest index) in the PDCCH search space applied to a certain UE with respect to each value L is changed according to the UEs for each subframe. This is referred to as PDCCH search space hashing.

Figure 9:
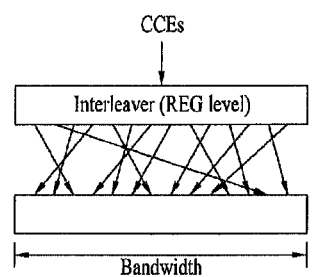
FIG. 9 shows an exemplary CCE distribution in a system band.

FIG. 9 shows an exemplary CCE distribution in a system band.

Referring to FIG. 9, a plurality of CCEs which are logically consecutive is input to an interleaver. The interleaver performs a function for interleaving the plurality of CCEs in REG units. Accordingly, the REGs configuring the CCE are scattered in the overall frequency/time domain within the control region of the subframe. In conclusion, the control channel is constructed in units of a CCE and interleaving is performed in units of an REG, such that frequency diversity and interference randomization gain can be maximized.

In order to select an uplink control channel for downlink traffic in the 3GPP LTE system, the embodiment of the present invention uses a method for identifying an uplink PDCCH resource index on the basis of the lowest index of a CCE actually used in a PDCCH to which downlink traffic scheduling information is transferred. In addition, in order to select a downlink control channel for uplink traffic in the 3GPP LTE system, the embodiment of the present invention uses a method for selecting PHICH resources on the basis of not only the value of a physical RB used for uplink traffic transmission but also an index of DM-RS used for traffic transmission. The relationship between uplink and downlink control channels corresponds to a single carrier relationship, and is defined when the number of uplink antennas is set to 1.

The number of uplink antennas for use in the 3GPP LTE system is higher than the number of uplink antennas of the legacy system, such that the MIMO operation starts. In this case, the number of antennas used by a user equipment (UE) for feedback information transmission may be set to 2 or greater, and the number of resources of a control channel used for such feedback information transmission may also be plural. In addition, an exemplary case in which a plurality of codewords are transmitted according to transmission modes of the UE may occur in uplink traffic, and one or more associated downlink PHICH resources may be allocated to each UE. In this case, there may be proposed a variety of methods for determining multiple control resources. For example, if it is necessary to use multiple resources, ACK/NACK information may be bundled to reduce the number of resources, or the antenna transmission mode may be set to a single antenna mode in the same manner as in the LTE system.

As a method for determining several control resources to be used in the MIMO system, the present invention provides a method for determining which resource is used as control resources to be used by a UE or a BS.

1. First Embodiment (Uplink Control Resource Decision)

In the case of deciding PUCCH resources to be used as a response to downlink traffic reception, the UE may consider which downlink traffic is to be received at the corresponding time point, and may also consider how to establish an uplink transmission mode. For example, provided that downlink traffic configured in the form of multiple carriers is received through multiple transmission blocks, the UE must transmit multiple ACK/NACK signals.

Figure 10:
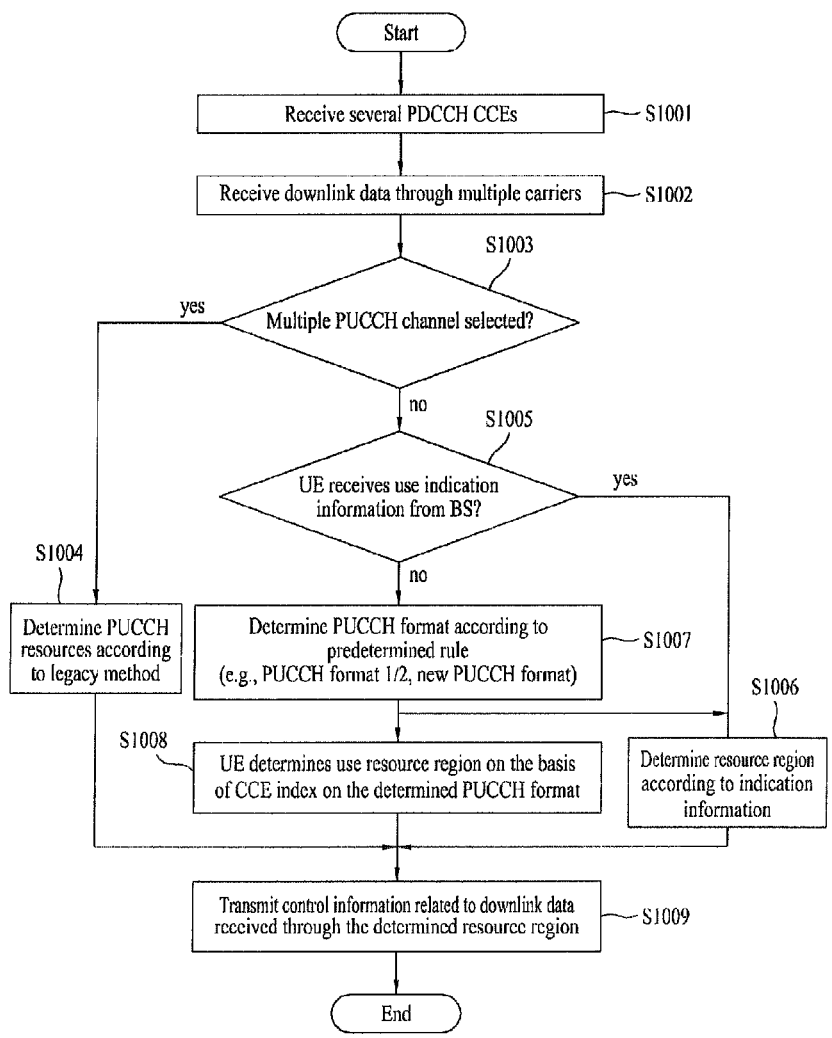
FIG. 10 is a flowchart illustrating a method for determining uplink control resources according to one embodiment of the present invention.

When a UE decides uplink control resources according to one embodiment of the present invention, the UE can decide uplink control resources according to the steps of FIG. 10.

FIG. 10 is a flowchart illustrating a method for determining uplink control resources according to one embodiment of the present invention.

Referring to FIG. 10, a UE receives a CCE of a downlink control resource (e.g., PDCCH) from a base station (BS), and also acquires various control information from the BS in step S1001. Thereafter, the UE receives downlink data through multiple carriers in step S1002. The UE may determine an uplink resource region (e.g., PUCCH) for transmitting uplink control information (e.g., ACK/NACK) related to the received downlink data in step S1003. A variety of embodiments may be applied to the method for determining control resources to be used by the UE over a PUCCH.

First, the UE having received multiple downlink data pieces through multiple carriers determines whether multiple PUCCH channels are to be used according to the received multiple downlink data in step S1003. If the UE selects multiple PUCCH channels, it may determine multiple PUCCH resources according to the legacy method in step S1004. In the case of determining uplink resources according to the legacy method, multiple control resources to be used by the UE in multiple PUCCH formats can be determined. For example, according to the method for determining uplink control resources used by the LTE system, the received CCE index is mapped to PUCCH resources such that a resource region to be used by the UE can be determined.

Provided that the UE selects an unused state of multiple PUCCH channels, the UE explicitly or implicitly receives indication information regarding a resource region from the BS, such that it can determine a resource region on the basis of the received indication information in step S1005.

Upon receiving indication information that specifies control resources used as multiple resources is to be used by the UE over a PUCCH from the BS, the UE may determine a PUCCH resource region according to indication information in step S1006. The above-mentioned indication information may include a PUCCH format to be used by the UE and location information of a specific resource region of the corresponding PUCCH format. The UE may transmit control information on uplink through the determined resource region. For example, the ACK/NACK signal for downlink traffic received through multiple carriers may be transmitted via uplink in step S1009.

If the UE does not receive indication information regarding the specific resource region from the BS, the UE may determine a PUCCH format according to a predetermined reference in step S1007.

A variety of PUCCH formats may be used, for example, a PUCCH format 1 of the legacy mode, a PUCCH format 2 defined in the LTE-A system, or a new PUCCH format, etc. The amount of uplink data may be used as a reference for deciding such PUCCH format. However, under the condition that resources used by the BS are dynamically changed by PUCCH errors, the BS may employ a specific PUCCH format. In this case, although the UE arbitrarily determines a PUCCH format in step S1007, the UE may use a PUCCH format according to indication information received from the BS.

The CCE index received at step S1002 is index-mapped to the PUCCH format decided at step S1007 according to a predetermined rule, such that a resource region to be used by the UE is determined in step S1008. A method for deciding resources will be described later.

Thereafter, the UE transmits control information to the BS on uplink through the control resource region determined on PUCCH in step S1009. In this case, the transmitted control information may be exemplarily set to an ACK/NACK signal of downlink traffic received through multiple carriers.

A method for deciding the uplink control resource region described in individual steps will hereinafter be described in detail.

1) Decision of Uplink Resource According to Legacy Mode

In the case of using a method for transmitting individual control information (e.g., ACK/NACK) through multiple PUCCH channels, a legacy channel structure according to the legacy mode may be used. In this case, the multiple PUCCH channels may be selected within one uplink carrier or multiple uplink carriers, and selection of PUCCH resources may have a predetermined rule according to carrier indexes.

For example, the UE may select a PUCCH resource according to a CCE index of the selected PDCCH using a method for selecting PDCCH resources by the legacy LTE system. In more detail, provided that the BS allocates uplink resources in such a manner that the same multiple CCEs employ the same uplink PUCCH resources during the resource allocation scheduling, the UE can recognize the location of a resource region allocated by PUCCH resources through CCE index mapping.

2) Uplink Resource Decision Using PUCCH Format 2

Referring to FIG. 10, in the case of using PUCCH format 2 as uplink control resources, the UE may explicitly receive information regarding resources to be used by the UE from among resources allocated to PUCCH format 2 in step S1006. Alternatively, the UE may dynamically and implicitly determine resources according to the amount of control information to be transmitted via uplink in steps S1007 and S1008.

When the UE implicitly determines PUCCH resources, the UE may decide the start position of resources to be used on the basis of a CCE index. For example, the start position of resources used by the UE may be mapped to a resource allocation region of PUCCH format 2 at intervals of a predetermined offset. The BS may transmit an offset value serving as system information to the UE, or may allocate the offset value to a UE or a UE group and then transmit the resultant offset value.

3) Uplink Resource Decision Using New PUCCH Format

The UE may transmit uplink control information using the new PUCCH format instead of the legacy PUCCH format 1 or 2. In this case, a method for allocating uplink control resources using the PUCCH format 2 may also be used as necessary. That is, the BS determines uplink control resources to be used by the UE and then explicitly indicates the determined control information in step S1006, or informs the UE of an offset value of the resource region location so that the UE may arbitrarily determine the resource region in steps S1007 and S1008.

Although the UE uses the new PUCCH format, control resources to be used in uplink are determined on the basis of the PDCCH CCE index. Herein, control resources to be used by the UE may start from the start position (e.g., index=0) of resources allocated by the new PUCCH format, or may be indexed and used on the basis of indexing based on a predetermined offset value.

4) PUCCH Format Decision According to Predetermined Rule

A method for determining PUCCH format according to a predetermined rule will hereinafter be described with reference to FIG. 10. If PUCCH format 1 defined in the legacy mode (e.g., LTE) is not used, the UE is differently operated according to a predetermined rule.

For example, a PUCCH format to be used may be determined on the basis of the number of bits of control information to be transmitted by the UE. If the number of control information bits is solved in PUCCH format 1, the corresponding PUCCH format 1 is used. If the number of control information bits is higher than the number of control information for use in the PUCCH format 1, information regarding the number of control information bits may be transmitted through PUCCH format 2 or the new PUCCH format.

However, even when the UE determines a PUCCH format according to a predetermined rule in the same manner as in the number of control information bits, the BS may transmit resource allocation information indicating a specific PUCCH format to the UE so as to prevent resources to be used from being dynamically changed by PDCCH errors.

2. Second Embodiment (Uplink Control Resource Decision in MIMO System)

Another example for determining uplink resources according to one embodiment of the present invention may include one case in which an uplink transmission mode is used in a MIMO format or another case in which spatial orthogonal-resource transmit diversity (SORTD) is used, and the another embodiment also assumes that multiple control resources are used in uplink.

Provided that an uplink transmission mode of the UE employs multiple antennas, resources of a control channel to be used by the UE may be determined to be multiple resources. In this case, downlink traffic may be transmitted as multiple carriers or as a single carrier.

For example, provided that multiple resources are transmitted through respective antennas in the same manner as in SORTD in order to perform uplink control channel transmission of the UE, the BS must definitely recognize elements of a control channel resource to be used by the UE.

For this purpose, the BS may employ a method for enabling the BS to explicitly indicate control channel resources to be used by the UE, or a method for enabling the BS to implicitly indicating control channel resources. In the case of using the above-mentioned method for implicitly indicating control channel resources, signaling overhead can be greatly reduced as compared to the other method for explicitly indicating control channel resources to be used by the UE.

In order to explicitly indicate control channel resources, the BS semi-statically establishes specific PUCCH resources in the UE, and the UE may use all the resources established by the BS as PUCCH resources. Alternatively, some of the entire control resources to be used by the UE may be used as resources semi-statically notified by the BS, and the UE may dynamically determine the remaining resources in consideration of a channel status or the amount of control information, etc. If necessary, all the control resources to be used by the UE may be explicitly or implicitly notified by the BS.

From among the above-mentioned methods, a method for enabling the BS to explicitly indicate the use or disuse of multiple resources or a method for enabling the UE to directly determine the use or disuse of multiple resources will hereinafter be described in detail.

Figure 11:
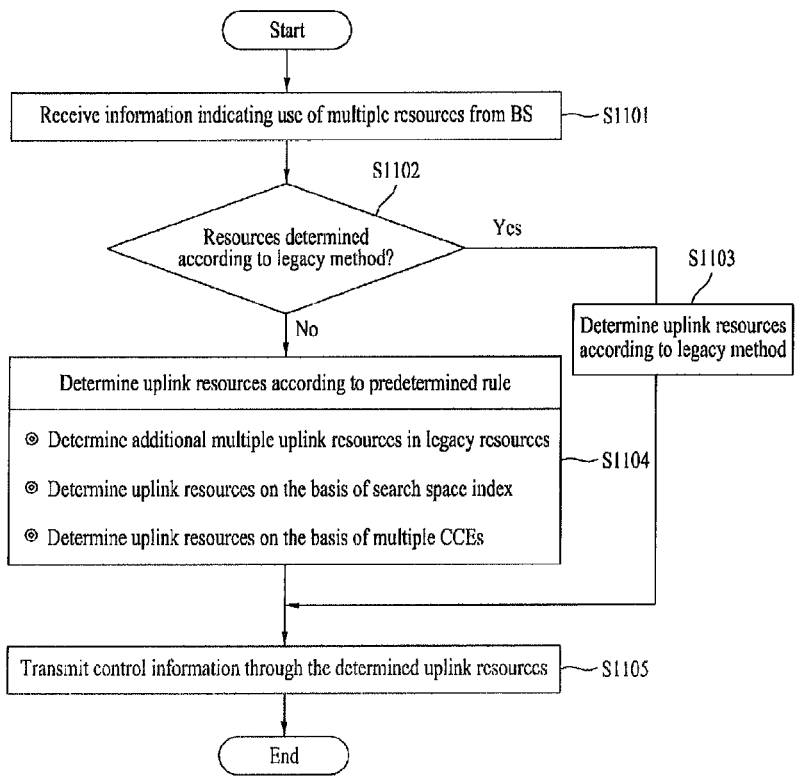
FIG. 11 is a flowchart illustrating a method for determining uplink control resources according to another embodiment of the present invention.

1) Method for Enabling BS to Explicitly Indicate Use of Uplink Multiple Resources FIG. 11 is a flowchart illustrating a method for determining uplink control resources according to another embodiment of the present invention. In more detail, FIG. 11 is a flowchart illustrating a method for allowing a BS to indicate the use of multiple resources.

Referring to FIG. 11, the UE receives indication information from the BS in step S1101, wherein the indication information explicitly indicates that multiple resources are used as uplink control resources.

Upon receiving the above-mentioned indication information from the BS, the UE may select multiple resources using an arbitrary resource selection method. In this case, the UE may determine multiple uplink control resources according to the legacy scheme (e.g., LTE system) in steps S1102 and S1103, or may determine multiple uplink control resources according to a predetermined rule in step S1104.

A method for enabling the UE to select multiple resources will hereinafter be described with reference to the following embodiments of the present invention.

A. Uplink Resource Decision According to Legacy Method

Referring to FIG. 11, when the UE determines uplink resources according to a legacy method in step S1103, the UE may increase an index number at a location adjacent to legacy PUCCH resources decided by a CCE index. In more detail, provided that the UE recognizes the start position of the CCE index in the legacy PUCCH resources on the basis of CCE index information received from the BS, the UE uses contiguous resources according to the number of resources to be used by the UE. For example, if two resources are used, a resource denoted by 'index_{legacy}' and a resource denoted by 'index_{legacy}+1' may be selected.

Alternatively, the UE may determine multiple resources by decreasing an index number at the location adjacent to the legacy PUCCH resources decided by the CCCE index. In this case, if the UE recognizes the start position of the CCE index, contiguous resources may be used according to the number of resources to be used by the UE.

B. Decision of Multiple Uplink Resources Added to Legacy PUCCH Resources

Referring to FIG. 11, uplink resources can be determined according to a predetermined rule instead of the legacy scheme in step S1104. For example, the UE may decide an index of control channel resources added to the legacy PUCCH resources according to the CCE index. In this case, the UE may determine an index of additional resources by determining whether the CCE index value is an odd or even number. For example, if the CCE index value is an even number, an index '+1' may be selected. If the CCE index value is an odd number, an index '−1' may be selected. If necessary, the opposite case may also be possible.

C. Uplink Control Resource Decision According to Search Space Index

Referring to FIG. 11, the UE may determine uplink resources using the predetermined rule instead of using the legacy scheme in step S1104. In another example, an index of control resources to be used by the UE can be determined according to an index of the search space acting as a CCE aggregate that must be confirmed for PDCCH reception of the UE. In this case, the start position of resources to be used as control resources of the UE is established in the same manner as in the legacy system (e.g., LTE), but indexes of additional control resources are determined according to the index of the CCE search space in which control information is detected at the legacy resource position. For example, if the search space index is denoted by an even number, the value '+1' may be selected. If the search space index is denoted by an odd number, the value '−1' may be selected. If necessary, the opposite case may also be possible.

D. Uplink Control Resource Decision in Case of Two or More CCEs

Referring to FIG. 11, the UE may determine uplink resources using the predetermined rule instead of using the legacy scheme in step S1104. In another example, it is impossible for another UE to use PUCCH resources indicated by the CCE index, such that as many PUCCH resources as the number of CCEs can be used. For example, if two CCEs are used as a downlink control channel, two PUCCH resources are mapped to the corresponding CCE indexes. Likewise, provided that resources corresponding to many more CCEs are used in downlink, the UE may select PUCCH resources from among many more CCEs. Assuming that the UE can correctly recognize the number of CCEs (for example, if information regarding the number of CCes is contained in control information, or if the control channel structure can recognize the number of CCEs), the UE selects a necessary number of CCEs from a plurality of CCEs such that it can use PUCCH resources corresponding to the selected CCEs.

For example, provided that four CCEs are assigned to PDCCH, the UE can employ four PUCCH resources mapped to each CCE. Two of the four PUCCH resources may be selected such that PUCCH resources can be used by a total of 6 combinations and the two PUCCH resources may be used as a transmission channel of 2-bits information. Generally, M resources may be selected from among N resources, and the channel selection concept may be introduced to PUCCH during the resource selection.

Thereafter, the UE transmits control information to the BS through uplink control resources serving as multiple resources in step S1105.

The above-mentioned method for deciding uplink resources in multiple resources is disclosed only for illustrative purposes, and the scope or spirit of the present invention is limited thereto.

2) Method for Determining Whether UE Uses Multiple Resources

If the number of resources to be used by the UE is directly determined, the UE operation may be complicated but the BS can more effectively manage resources. If the UE arbitrarily determines whether to use multiple resources, the UE may select resources as shown in FIG. 12.

Figure 12:
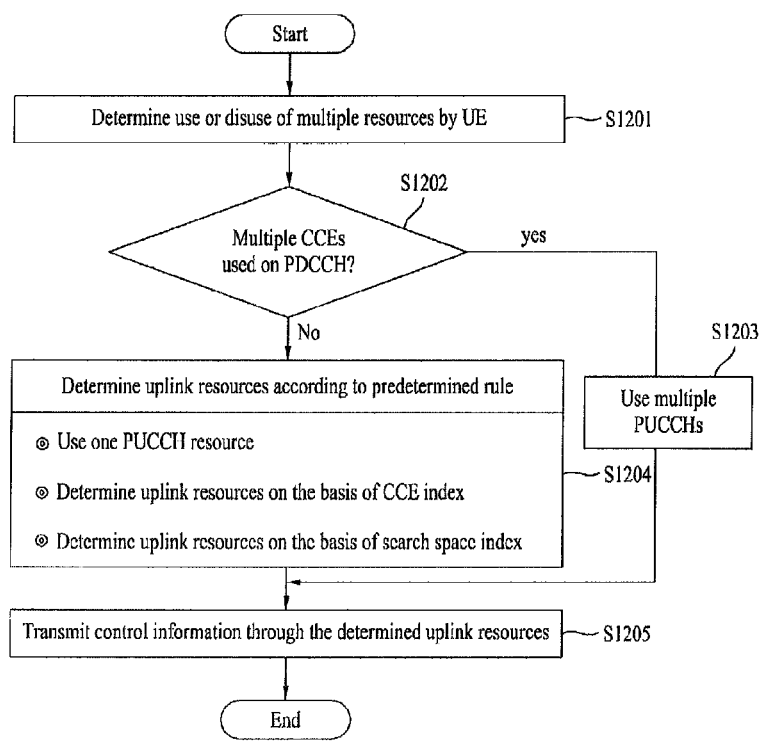
FIG. 12 is a flowchart illustrating a method for determining uplink control resources according to still another embodiment of the present invention.

FIG. 12 is a flowchart illustrating a method for determining uplink control resources according to still another embodiment of the present invention. In more detail, FIG. 12 is a flowchart illustrating a method for allowing a UE to arbitrarily use multiple resources.

Referring to FIG. 12, provided that the UE decides to use multiple resources when transmitting uplink control information according to the received downlink traffic in step S1201, the resource selection scheme may be differently determined according to the number of CCEs used in PDCCH.

If two or more CCEs are used in PDCCH, multiple PUCCHs can be used as multiple resources even in the uplink resource region in steps S1202 and S1203.

In case of using a single CCE on a PDCCH, uplink resources are determined according to the predetermined rule and the same time an uplink resource region may be determined using CCE resources to be used by other UEs, or only one PUCCH resource may be used according to a single CCE or the number of resources may be determined according to the CCE index. Alternatively, the number of uplink resources may be determined on the basis of the search space index in such a manner that uplink resources can be determined according to various rules in step S1204.

Thereafter, the UE may perform uplink transmission of control information through the decided uplink resource region in step S1205. As a representative example of the control information, an ACK/NACK signal depending on downlink traffic reception may be used.

A. Case in which the Number of CCEs is 2 or Higher

In FIG. 12, if multiple CCEs are used for one UE in step S1202, PUCCH resources corresponding to the CCE index cannot be used by other UEs, such that the corresponding UE uses multiple PUCCH resources as uplink control resources in step S1203. In addition, transmission of additional information is possible in the process for selecting only necessary resources from among multiple resources.

B. Case in which the Number of CCEs is Set to 1

In FIG. 12, if only one CCE is used for a single UE in step S1202, the corresponding UE may use resources corresponding to one CCE or may retrieve CCEs used by other UEs and use the retrieved CCEs as multiple resources.

First, in the case of using one CCE according to the legacy mode, the UE may use only one PUCCH defined by resource mapping in the legacy system.

Second, in the case of determining the number of resources according to the CCE index, the UE uses only one resource when the CCE index is denoted by an odd number, the UE uses two resources when the CCE index is denoted by an even number, such that multiple CCEs can be configured. In this case, the CCE resource may be configured in the form of 'Index_{legacy}+1' or 'Index_{legacy}−1' and then used.

Third, the number of resources can be determined according to the search space index. For example, if the detected search space in which control information is detected has an odd index, the UE uses only one control channel resource. If the detected search space in which control information is detected has an even index, the UE may further use channel resources based on the format 'Index_{legacy}+1'. Alternatively, the UE may use channel resources based on the format 'Index_{legacy}−1'. If necessary, operations encountered by the odd or even index may also be opposite to the above-mentioned operations.

As described above, in the case of defining the search space by the BS, the BS may define the search space as in the legacy mode, or a UE-specific search space may be defined according to an odd CCE index or an even CCE index. Alternatively, the search space may be defined at the location indicating a predetermined reminder on the basis of an arbitrary modulo operation.

3. Third Embodiment (Method for Determining PHICH Resources)

If the UE transmits uplink traffic, the UE uses PHICH resources as a channel for transmitting a downlink ACK/NACK signal replying to the uplink traffic. As described above, a PHICH includes three REGs and is cell-specifically scrambled.

In the case of the LTE system, the UE is operated in the single antenna mode, so that the number of PHICH ACK/NACK resources to be transmitted is set to 1 denoted by one bit. In contrast, since the UE of the LTE-A system can stay in the multi-antenna mode, the number of codewords capable of being simultaneously transmitted via uplink may be set to 2 or higher. Therefore, the number of PHICH resources simultaneously used in the multi-antenna mode may be plural in the same manner as in the LTE-A system.

Figure 13:
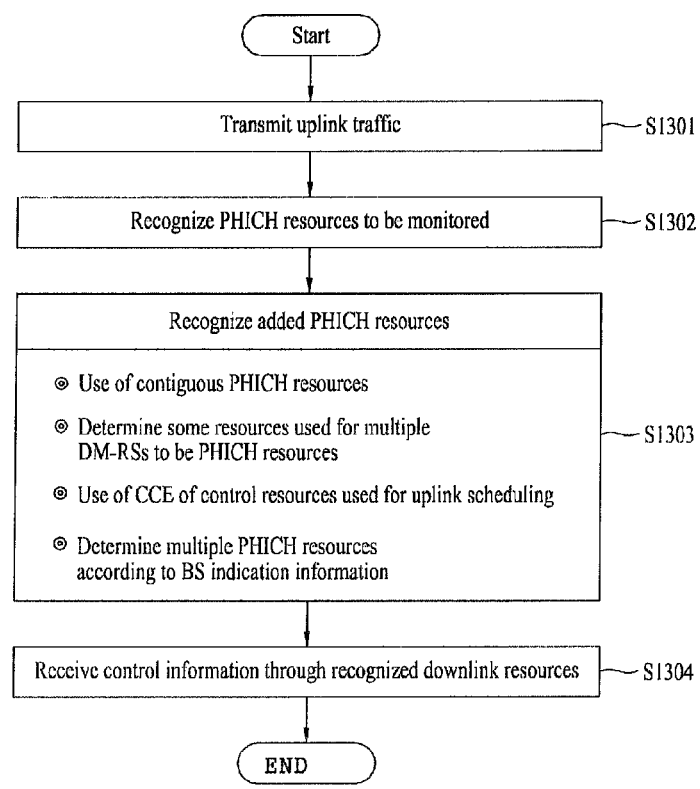
FIG. 13 is a flowchart illustrating a method for determining downlink resources according to one embodiment of the present invention.

FIG. 13 is a flowchart illustrating a method for determining downlink resources according to one embodiment of the present invention.

Referring to FIG. 13, the UE transmits uplink traffic to the BS in step S1301, and recognizes the location of PHICH resources so as to receive a downlink ACK/NACK signal in response to the transmitted uplink traffic in step S1302. In this case, in order to recognize the location of PHIC resources to be monitored by the UE, the UE for use in the legacy mode can analogize the correct resource index of the PHICH not only using the value of a PRB index (or a resource allocation unit) of resources scheduled by the BS, but also using a mediation value (e.g., cyclic shift index of DM-RS in case of the LTE). Resources calculated by the legacy mode are used for transmitting one ACK/NACK.

Therefore, there are a variety of methods for determining PHICH resources added to the legacy-mode PHICH resources in step S1303, and a detailed description thereof will hereinafter be described in detail.

1) Use of Contiguous PHICH Resources

Indexes of the contiguous PHICH resources may be increased or decreased according to the BS configuration information. The start position of the contiguous PHICH resources may be set to the location of PHICH resources determined by the legacy mapping scheme.

2) Use of Resources Corresponding to DM-RS Cyclic Shift of the Second DM-RS

If the UE transmits two or more codewords through multiple antennas, it should be noted that respective channels must be distinguished from one another. Thus, multiple DM-RS cyclic shifts must also be used. Therefore, when determining multiple PHICH resources, PHICH resources used for a DM-RS corresponding to each antenna may be determined as resources of ACK/NACK signal reception. In this case, a first resource may be mapped to a first codeword, and a second resource may be mapped to a second codeword. If necessary, the first resource may also be mapped to the second codeword and the second resource may also be mapped to the first codeword.

3) CCE Utilization of Control Resources Used for Uplink Scheduling

In this case, the location of PHICH resources to be used is changed according to a CCE index at a PDCCH to which uplink scheduling information is transmitted.

For example, if the CCE index is denoted by an even number, a PHICH resource having an offset (+1) may be used. If the CCE index is denoted by an odd number, a PHICH resource having an offset (−1) may be used. Of source, if the CCE index is denoted by an even or odd number, PHICH resources may be mapped in reverse order to that of the above-mentioned mapping, and the offset value may also be changed to another.

4) Case for Indicating that PHICH Resources Used Through Control Information is Multiple Resources The UE may use PHICH resources directly indicated by the BS. The BS includes information regarding PHICH resources used in the UE resource allocation scheduling process in control information, and the corresponding information may be an offset of a resource index of the legacy mode or an added PHICH resource index.

5) Case Including Multiple Uplink Carriers

Uplink physical resource indexes used in the legacy mode may be acquired by concatenated indexing of multiple uplinks, or may be independently indexed in each uplink component carrier (each UL CC).

Thereafter, the UE can receive downlink control information from the BS not only through PHICH resources recognized by the legacy mode, but also through additional PHICH resources in step S1304. For example, ACK/NACK signals for answering uplink traffic may be used as Rx downlink control information.

The base station (BS) and the user equipment (UE) applicable to embodiments of the present invention will hereinafter be described with reference to FIG. 14.

Figure 14:
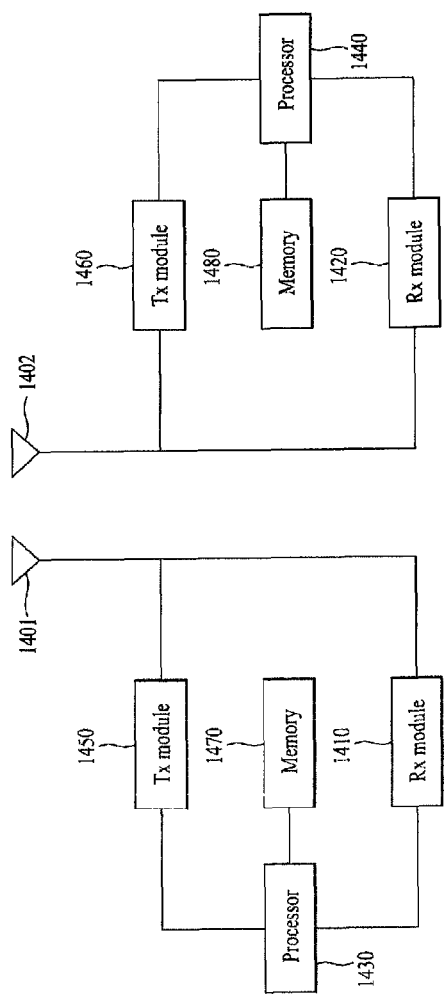
FIG. 14 is a block diagram illustrating a base station (BS) and a user equipment (UE) according to one embodiment of the present invention.

FIG. 14 is a block diagram illustrating a base station (BS) and a user equipment (UE) according to one embodiment of the present invention.

Referring to FIG. 14, the UE may operate as a transmitter on uplink and as a receiver on downlink, while the BS may operate as a receiver on uplink and as a transmitter on downlink. That is, each of the UE and the BS may include a transmitter and a receiver for transmission and reception of information or data.

The transmitter and the receiver may include processors, modules, parts, and/or means for implementing the exemplary embodiments of the present invention. Especially, the transmitter and the receiver may include a module (means) for encrypting messages, a module for interpreting encrypted messages, an antenna for transmitting and receiving messages, etc.

Referring to FIG. 14, the left part corresponds to the transmitter (i.e., the BS) and the right part corresponds to the receiver (i.e., the UE). Each of the transmitter and the receiver may include an antenna 1401 or 1402, a Reception (Rx) module 1410 or 1420, a processor 1430 or 1440, a Transmission (Tx) module 1450 or 1460, and a memory 1470 or 1480.

The antennas 1401 and 1402 include Tx antennas for transmitting signals generated from Tx modules 1450 and 1460 to an external part, and Rx antennas for receiving radio frequency (RF) signals from the external part and providing the received RF signals to the Rx modules 1410 and 1420. If Multiple Input Multiple Output (MIMO) is supported, two or more antennas may be provided.

The Rx modules 1410 and 1420 may recover original data by demodulating and decoding data received through the antennas 1401 and 1402 and provide the recovered data to the processors 1430 and 1440. Although the Rx modules and the antennas may be separated from each other as shown in FIG. 14, it should be noted that the Rx modules and the antennas may also be denoted only by the receiver for receiving RF signals.

The processors 1430 and 1440 generally provide overall control to the AMS. Especially, the processors 1430 and 1440 may perform a controller function for implementing the above-described exemplary embodiments of the present invention, a variable MAC frame control function based on service characteristics and a propagation environment, a handover (HO) function, an authentication and encryption function, etc.

The Tx modules 1450 and 1460 perform predetermined coding and modulation for data, which is scheduled by schedulers connected to the processors 1430 and 1440 and transmitted to the outside, and then transfer the modulated data to the antennas 1401 and 1402. The Tx modules and the antennas may be separated from each other as shown in FIG. 14, it should be noted that the Tx modules and the antennas may also be denoted only by the transmitter for transmitting RF signals.

The memories 1470 and 1480 may store programs for processing and control of the processors 1430 and 1440, temporarily store input/output data (uplink (UL) grant, system information, station identifier (STID), flow identifier (FID), action time, etc. in case of the UE).

In addition, each of the memories 1470 and 1480 may include at least one type of storage media such as a flash memory, a hard disk, a multimedia card micro, a card-type memory (e.g. a Secure Digital (SD) or eXtreme Digital (XD) memory), a Random Access Memory (RAM), a Static Random Access Memory (SRAM), a Read-Only Memory (ROM), an Electrically Erasable Programmable Read-Only Memory (EEPROM), a Programmable Read-Only Memory, a magnetic memory, a magnetic disc, an optical disc, etc.

The processor 1430 of the transmitter performs overall control of the BS. In accordance with the embodiments shown in FIGS. 10 to 13, resource allocation scheduling is performed.

In this case, the processor 1430 determines a PUCCH format used as uplink control resources. From among resources allocated to the determined PUCCH format, indication information for specifying a resource region to be used by control information transmission of the UE is generated, such that the resultant indication information may be transmitted to the receiver through the Tx module 1450. Alternatively, CCE index information of a PDCCH can be transmitted to the receiver in such a manner that implicit indication information related to a resource region, instead of explicit indication information related to a resource region, is generated, and the processor 1440 of the receiver can analogize and use the resource region on the basis of the implicit indication information. Alternatively, in the case of using multiple antennas in the same manner as in the MIMO system, indication information indicating the use of multiple resources on uplink may be generated and transmitted to the receiver.

The processor 1140 of the receiver provides overall control to the UE, and it can specify a resource region to be used on uplink using explicit or implicit indication information received from the transmitter.

In more detail, a PUCCH format is determined according to the embodiments shown in FIGS. 10 to 13, and the corresponding information is mapped to a PUCCH resource region on the basis of the PDCCH CCE index in the resource region allocated to the determined PUCCH format, such that the resource region to be used can be determined. Alternatively, the processor 1440 of the receiver receives indication information indicating the use of multiple resources from the transmitter, such that the resource selection operation related to the corresponding indication information may be performed or the processor 1440 of the receiver may arbitrarily determine whether to use multiple resources.

The resource region to be used by the UE in a PDCCH may be determined to be uplink control resources. In accordance with the above-mentioned embodiment shown in FIG. 13, the resource region in which the UE can receive control information over a PHICH may be determined to be downlink control resources.

In the meantime, the BS may perform a control function for implementing the above-described exemplary embodiments of the present invention, Orthogonal Frequency Division Multiple Access (OFDMA) packet scheduling, Time Division Duplexing (TDD) packet scheduling and channelization, a variable MAC frame control function based on service characteristics and propagation environment, a real-time high-speed traffic control function, a handover function, an authentication and encryption function, a packet modulation/demodulation function for data transmission and reception, a high-speed packet channel coding function, a real-time MODEM control function, etc., by at least one of the above-described modules, or the BS may further include an additional module, part or means for performing these functions.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other.

Accordingly, the invention should not be limited to the specific embodiments described herein, but should be accorded the broadest scope consistent with the principles and novel features disclosed herein.

INDUSTRIAL APPLICABILITY

The embodiments of the present invention are applicable to various wireless access systems including a $3^{rd}$ Generation Partnership Project (3GPP) system, a 3GPP2 system, and/or an Institute of Electrical and Electronic Engineers (IEEE) 802.xx system. Besides these wireless access systems, the embodiments of the present invention are applicable to all technical fields to which wireless access systems are applied.

The invention claimed is:

1. A method for transmitting uplink control information (UCI) through a physical uplink control channel (PUCCH) by a user equipment in a wireless communication system supporting multiple carriers, the method comprising:
receiving a physical downlink control channel (PDCCH) signal via one or more control channel elements (CCEs): and
determining a first PUCCH resource for the UCI on the basis of an index of a first CCE of the one or more CCEs,
wherein if a number of the one or more CCEs is 1 and if an index of the first CCE is an odd number, no more PUCCH resources are provided for the UCI, and
wherein if the number of the one or more CCEs is more than 1 or if the index of the first CCE is an even number, a second PUCCH resource is additionally provided for the UCI on the basis of a sum of the index of the first CCE and an offset.

2. The method according to claim 1, wherein the offset is a positive integer or a negative integer.

3. The method according to claim 1, further comprising:
receiving a physical downlink shared channel (PDSCH) signal indicated by the PDCCH signal,
wherein the UCI includes acknowledgement (ACK)/negative acknowledgement (NACK) information for the PDSCH signal.

4. A user equipment for use in a wireless communication system supporting multiple carriers, the user equipment comprising:
- a transmission module configured to transmit uplink control information (UCI) through a physical uplink control channel (PUCCH);
- a reception module configured to receive physical downlink control channel (PDCCH) signal via one or more control channel elements (CCEs); and
- a processor configured to determine a first PUCCH resource for the UCI on the basis of an index of the first CCE of the one or more CCEs,
- wherein if a number of the one or more CCEs is 1 and if an index of the 1st CCE is an odd number, no more PUCCH resources are provided for the UCI, and
- wherein if the number of the one or more CCEs is more than 1 or if the index of the first CCE is an even number, a second PUCCH resource is additionally provided for the UCI on the basis of a sum of the index of the first CCE and an offset.

5. The user equipment according to claim 4, wherein the offset is a positive integer or a negative integer.

6. The user equipment according to claim 4,
- wherein the reception module is further configured to receive a physical downlink shared channel (PDSCH) signal indicated by the PDCCH signal,
- wherein the UCI includes acknowledgement (ACK)/negative acknowledgement (NACK) information for the PDSCH signal.

* * * * *

UNITED STATES PATENT AND TRADEMARK OFFICE
CERTIFICATE OF CORRECTION

| | | |
|---|---|---|
| PATENT NO. | : 8,964,670 B2 | Page 1 of 1 |
| APPLICATION NO. | : 13/520295 | |
| DATED | : February 24, 2015 | |
| INVENTOR(S) | : Yeong Hyeon Kwon et al. | |

It is certified that error appears in the above-identified patent and that said Letters Patent is hereby corrected as shown below:

ON THE TITLE PAGE:

At item (75), Inventors, change "So Yeon Kim, Anyang-si (KP)", to --So Yeon Kim, Anyang-si (KR)--.

Signed and Sealed this
Twenty-ninth Day of September, 2015

Michelle K. Lee
*Director of the United States Patent and Trademark Office*